2,954,390

PROCESS FOR PREPARING BETA-PHENYL-
ETHYLCHLOROSILANES

Roscoe A. Pike, Grand Island, and Robert C. Borchert, West Seneca, N.Y., assignors to Union Carbide Corporation, a corporation of New York No Drawing. Filed Dec. 5, 1957, Ser. No. 700,734

12 Claims. (Cl. 260—448.2)

This invention relates to improved processes for the preparation of beta-phenylethylchlorosilanes. More particularly, this invention is concerned with the controlled addition reaction of a chlorosilane which contains at least one hydrogen atom bonded to silicon, such as trichlorosilane (HSiCl$_3$) or methyldichlorosilane (MeSiHCl$_2$), to styrene to produce a beta-phenylethylchlorosilane isomer.

The addition of silanes containing at least one hydrogen atom bonded to silicon to unsaturated organic compounds is known in the art. Generally, such additions result in a mixture of various isomers. For example, in known addition reactions of methyldichlorosilane (MeSiHCl$_2$) to styrene using a platinum-type catalyst, some of the silanic-bonded hydrogen atoms of the silane molecules attach to the carbon atom nearest the benzene ring while the silyl radicals of the silane attach to the carbon atom farthest from the benzene ring, and some silanic-bonded hydrogen atoms and silyl radicals attach in the opposite positions. Accordingly, there results from such addition a mixture of beta-phenylethylmethyldichlorosilane and alpha-phenylethylmethyldichlorosilane.

In addition, it is also known, that a platinum-on-charcoal catalyst may be used to control the addition of trichlorosilane to styrene to obtain the beta isomer. Thus Wagner et al., Ind. Eng. Chem. 45, 367 (1953), has reported the use of such a catalyst to obtain the beta isomer when reacting trichlorosilane and styrene by heating under pressure at 200° C. for 20 hours.

However, the use of platinum-on-charcoal catalyst to obtain a betaphenylethylchlorosilane, as suggested by Wagnet et al., is accompanied by certain disadvantages. Thus, where a platinum-on-charcoal catalyst is employed, the reaction tends to exhibit long inhibition periods before starting. The mixing of large amounts of reactants to overcome this is usually accompanied by extremely exothermic and violent reaction upon initiation. Likewise, the use of a platinum-on-charcoal catalyst results in the polymerization of substantial amounts of styrene, with a corresponding decrease in yield of the desired addition product, unless special precautions, such as temperature control and/or large excesses of chlorosilane, are employed.

The principal object of this invention is, therefore, to provide an improved process for preparing beta-phenyl-ethylchlorosilanes.

A particular object of this invention is to provide a new and improved method of preparing beta-phenyl-ethylchlorosilanes by the addition of a chlorosilane containing at least one Si—H bond of styrene, whereby the beta-isomer is produced exclusively, without the disadvantages encountered when employing the Wagner technique, and whereby the necessity of a careful and costly distillation as is required in other prior art processes to separate the beta- and alpha-isomers is eliminated.

It is also a further object of this invention to provide a controlled addition reaction of a chlorosilane, which contains at least one hydrogen atom bonded to silicon, to styrene whereby the proportional yields of beta isomer to alpha isomer can be substantially increased.

One aspect of this invention is based on the discovery that chlorosilanes having at least one Si—H bond can be added to styrene in the presence of tetrahydrofuran as solvent, and a platinum-type catalyst, to provide exclusively a beta-phenylethylchlorosilane. The reaction may be represented by the following skeletal equation:

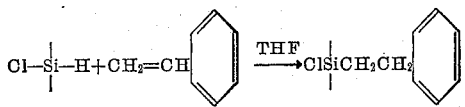

In accordance with another aspect of this invention, it has been found that the reaction involving the addition of a chlorosilane, having at least one Si—H bond, to styrene, can be controlled to produce substantially higher proportional yields of beta-phenylethylchlorosilane isomers over alpha-phenylethylchlorosilane isomers, by conducting the reaction in the presence of a platinum-type catalyst and a highly polar organic ether solvent which readily solvates the silicon atom of the silane employed in the reaction.

The process of this invention may be practiced with any chlorosilane, i.e. monochlorosilanes, dichlorosilanes and trichlorosilanes, containing at least one silicon-bonded hydrogen atom. The other unsatisfied valence bonds of the silicon atom, if any, may be satisfied with any saturated aliphatic or aromatic hydrocarbon radical, or substituted saturated aliphatic or substituted aromatic hydrocarbon radical. The chlorosilane reactants may be depicted in general by the following structural formula:

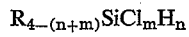

wherein R represents an alkyl radical, such as methyl, ethyl, propyl, and the like, an aryl radical, such as phenyl, naphthyl, and the like, a substituted alkyl radical, such as cyanoalkyl, carbethoxylalkyl, and the like, a substituted aryl radical, such as haloaryl, cyanoaryl, carbethoxyaryl, or an alkyl, aryl, aralkyl, or alkaryl ether radical; $n$ has a value of from 1 to 3; $m$ has a value of from 1 to 3; and the sum of $n+m$ is no more than 4.

The solvents that can be used to carry out the present process in order to obtain high percentage yields of the beta-isomer include the polar organic ethers which have a high degree of solvating power for the silicon atom of the silane. As examples of the solvents which can be employed in accordance with the process of our invention are cyclic aliphatic ethers, linear aliphatic ethers (including mixed aliphatic ethers), aryl ethers (and mixed aryl ethers), and mixed aliphatic-aromatic ethers. Specifically, such ethers as dioxane, butylmethyl ether, phenylmethyl ether, n-butyl ether, ethylene glycol dimethyl ether, and tetrahydrofuran may be employed as solvents with good results.

In commercial practice, it is preferred to employ tetrahydrofuran as solvent, for it results in the production of the beta-isomer to the exclusion of the alpha-isomer. Thus, the need for a careful and costly distillation to separate the beta- and alpha-isomers is eliminated, and this is accomplished without the disadvantages encountered when employing the Wagner technique.

Although we do not wish to be bound by any one theory, it is believed that the relative amount of beta-isomer obtained is related to the polarity of the ether employed as solvent, and to the ease with which the ether solvates the silicon atom of the silane employed in the reaction. As the polarity and solvating power of the ether solvent increases, so does the relative yield of beta-isomer. Accordingly, through the selective use of polar solvents which readily solvate the silane employed, it is possible to control the addition of a chlorosilane to styrene so as to obtain a desired relative amount of beta-isomers.

The relationship of the polarity and solvating power of the ether employed to the yields of beta- and alpha-isomers is shown in Table I below, where the yields of beta- and alpha-isomers obtained in various solvents using a platinum on gamma-alumina catalyst are compared.

TABLE I

*Effect of solvent upon ratio of isomers*

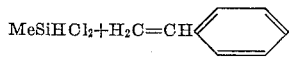

| Solvent | Percent Alpha | Percent Beta |
|---|---|---|
| No solvent | 45 | 55 |
| n-Butyl ether | 22.6 | 77.4 |
| Ethylene glycol dimethyl ether | 12.5 | 87.5 |
| Tetrahydrofuran | 0 | 100 |

In addition to increasing the proportional yields of beta-phenylethylchlorosilane isomers, when an organic ether is employed as solvent, the reaction initiates immediately with no observable thermal "bump," as happens when a beta-directing catalyst is employed without a solvent as in Wagner, supra. As a result, the polymerization of styrene is substantially decreased, and the yield of phenylethylchlorosilane correspondingly increased. Accordingly, even when employing a beta-directing catalyst, the present invention provides a more effective control of the reaction.

In accordance with our invention, beta-phenylethylchlorosilanes are obtained by admixing styrene, a chlorosilane which contains at least one hydrogen atom bonded to silicon, a platinum-type catalyst, an organic ether solvent, and heating the mixture to effect the desired addition of the chlorosilane to the styrene.

Reaction may be effected according to our process either under pressure or at atmospheric conditions. For example, where methyldichlorosilane is employed as one of the reactants, reaction may be effected by refluxing said chlorosilane by any suitable means at atmospheric conditions with a mixture of styrene, a platinum-type catalyst, and an organic ether solvent. However, when trichlorosilane is employed as one of the reactants, we prefer to conduct the reaction under pressure in order to facilitate handling and minimize loss of the chlorosilane which boils at 31.8° C. under atmospheric conditions. In such case, the reaction mixture may be charged to a steel pressure vessel or sealed autoclave, or other suitable apparatus, and heated to effect reaction.

Preferably the reaction is effected by first forming a mixture of a suitable chlorosilane, a platinum-type catalyst, an organic ether solvent, and heating said mixture under atmospheric conditions, preferably to its refluxing temperature, before the addition of the styrene, and thereafter gradually and slowly adding styrene to the heated mixture with constant stirring. For example, when employing methyldichlorosilane as one of the reactants under atmospheric conditions, initial mixing temperatures of from as low as 25° C. to as high as 60° C. are advantageously employed, but preferably temperatures of from 40° C. to 45° C. are employed. However, it should be understood that the initial mixing temperature is not critical and may vary within a wide range; however, best results have been obtained by heating the mixture to its refluxing temperature before adding styrene.

The temperatures and pressures at which the styrene and chlorosilane react are not critical and can vary over a wide range. Where the reaction is conducted under atmospheric conditions, the temperature upon continued heating will gradually rise to the refluxing temperature of the mixture. Preferably, the reaction is conducted under atmospheric conditions at the refluxing temperature of the mixture. Reaction may also be effected at lower than refluxing temperatures by controlled heating; however, no commensurate advantage is obtained thereby.

The reaction may also be run under pressure. However, if the reaction is run in a closed system, as in the case of trichlorosilane, care must be exerted to prevent the temperature from rising above the point where excessive reaction between the solvent and the chlorosilane will occur. When employing trichlorosilane as a reactant, under pressure, reaction initiates at a temperature between 60° C. and 80° C. with the reaction temperature gradually rising as heating is continued. Where tetrahydrofuran is employed as solvent, if the temperature is allowed to exceed 145° C., esters of the type $\equiv SiOCH_2CH_2CH_2CH_2$ will be formed. In general, the reaction temperature is not critical and may vary widely provided care is exerted to prevent the temperature from rising above the point where excessive reaction between the solvent and the chlorosilane occurs.

Whether reaction is effected at atmospheric pressure or at increased pressures, we prefer to heat the combined reaction mixture for approximately one hour in order to drive the reaction to completion. Times greater or less than one hour can also be effectively employed; however, no commensurate advantage is obtained thereby.

The proportion of styrene to chlorosilane employed can vary over a wide range. Preferably, however, the mixture contains no more than 1 molar excess of either reactant per mol of the other reactant. From a practical standpoint, particularly good results are obtained when the reaction mixture contains approximately equimolar proportions of styrene and chlorosilane. Excesses of greater than 1 mol of either reactant may be employed; however, no commensurate value is obtained thereby.

As catalyst in our reaction we employ a platinum-type catalyst. For example, as catalyst we can employ a chloroplatinum-acid type catalyst, or platinum such as chloroplatinic acid in a finely divided state, either alone, in combination with an inert support, or as one element of a heterogeneous or multi-component platinum-containing admixture, such as platinum deposited on the gamma-allotrope of alumina.

We have found that the amount of catalyst employed in our process is not narrowly critical. Thus, the amount of overall catalyst can vary from about 0.1 to 5.0 weight percent of the total weight of starting material. We prefer to use 0.5 to 2.0 weight percent catalyst of the total weight of starting material. When using a platinum on gamma-alumina catalyst, we prefer to use a concentration of catalyst of two weight percent of reactants of 2 percent Pt on $Al_2O_3$. An amount of catalyst whether employed alone, in combination with an inert support, or as a multi-component mixture in smaller or greater quantities than the ranges hereinabove stated can also be employed; however, no commensurate advantage is obtained thereby.

The amount of solvent employed in accordance with the process of our invention depends upon the particular solvent used and the results desired. An amount of solvent ranging from 0.5 to 10 times the weight of styrene used can be advantageously employed. We prefer to employ an amout of solvent from 1 to 2 times the weight of styrene since, when larger amounts of these polar solvents are employed, considerable quantities of "heavies" result due to the polymerization of styrene. An amount of solvent outside the broader disclosed range can also be employed; however, no commensurate advantage is obtained thereby.

The beta-phenylethylchlorosilanes prepared in accordance with our invention, because of their greater stability in an acidic medium, are more useful than the alpha-isomers in preparing organofunctional aryl derivatives, such as sufonyl chlorides and sulfonic acids. The beta-isomers are also useful in preparing phenylethyl-modified dimethyl silicone oils, which are useful as effective rubber lubricants.

The following examples of our invention are set forth so that those skilled in the art may better understand our invention and are by way of illustration only, and are not to be construed as limiting our invention in any manner. In each of the examples, 2 weight-percent Ionol (tert.-butyl paracresol) was used as a polymerization inhibitor for styrene. The crude products were distilled at atmospheric or reduced pressure through suitable packed columns in order to separate the respective isomers, which were identified by refractive index ($n_D^{25}$) and infrared spectroscopy methods. Samples of pure alpha- and beta-phenylethylmethyldichlorosilane, and 2:1 and 1:2 mixtures of the alpha- and beta-isomers were prepared. A graph of mole-percent alpha-beta isomer vs. refractive index was thus prepared, and the graph used in connection with refractive index and infrared spectroscopy methods to determine the ratio of alpha- and beta-isomers obtained by the use of the various solvents set forth in Table I.

EXAMPLE I

Addition of MeSiHCl₂ to styrene in tetrahydrofuran
(4 times weight of styrene)

57.5 grams of methyldichlorosilane (0.5 mole), 2.2 grams (2 wt.-percent catalyst of reactants) of 2 percent Pt/Al₂O₃, 2.2 grams of Ionol (2 wt.-percent of reactants), and 208.0 grams of tetrahydrofuran (4 times weight of styrene) were added to an argon-purged 1-liter, 3-necked flask fitted with dropping funnel, mechanical stirrer, thermometer, and reflux condenser. Heat was applied and the solution brought to gentle reflux (47° C.). 52.1 grams of styrene (0.5 mole) were added with stirring over a 45-minute period with reaction temperature rising gradually to 65° C. Reflux was continued for 1 hour and the solution cooled to room temperature. The catalyst was removed and solvent stripped under reduced pressure. The remaining liquid was fractionated through a 30-cm. Vigreaux column. A fraction (B.P. = 66° C.–70° C. at 0.7 mm.) ($n_D^{25}$ = 1.5100) was obtained in 71.0 percent yield and further identified as solely beta-isomer by infra-red analysis. Non-distillables accounted for 20.8 wt.-percent of the charge.

EXAMPLE II

Addition of MeSiHCl₂ to styrene in tetrahydrofuran
(2 times weight of styrene)

57.5 grams of methyldichlorosilane (0.5 mole), 2.2 grams (2 wt.-percent catalyst of reactants) of 2 percent Pt/Al₂O₃, 2.2 grams of Ionol (2 wt.-percent of reactants), and 104.0 grams of tetrahydrofuran (2 times weight of styrene) were charged to an argon-purged 1-liter, 3-necked flask fitted with dropping funnel, mechanical stirrer, thermometer, and reflux condenser. Heat was applied and the solution brought to gentle reflux (45° C.). 52.1 grams of styrene (0.5 mole) were added with stirring over a 45-minute period with reaction temperature gradually rising to 68° C. Reflux was continued for 1 hour, the solution cooled to room temperature, the catalyst filtered, and solvent stripped at reduced pressure. The crude was fractionated through a 30-cm. Vigreaux column. A fraction (B.P.=62° C. 0.4 mm. –67° C. 0.5 mm.) ($n_D^{25}$=1.5108) was obtained in 69.4 percent yield and further identified as solely beta-isomer by infra-red analysis. Heavies accounted for 6.5 wt.-percent of the charge.

EXAMPLE III

Addition of MeSiHCl₂ to styrene in n-butyl ether 57.5 grams of methyldichlorosilane (0.5 mole), 2.2 grams (2 wt.-percent catalyst of reactants) of 2 percent Pt/Al₂O₃, 2.2 grams of Ionol (2 wt.-percent of reactants), and 104 grams of normal butyl ether (2 times weight of styrene) were charged to a 1-liter, 3-necked flask fitted with dropping funnel, mechanical stirrer, and reflux condenser. Heat was applied and the solution brought to gentle reflux, with 52.1 grams of styrene (0.5 mole) added with stirring over a period of 1 hour. Reflux was continued for 1 additional hour, the solution cooled and filtered, solvent stripped, and distilled through a "Hastelloy B" packed column. Fractions (B.P. 232°–240° C. and 240° C.–243° C.) were obtained in 76.5 percent yield (22.6 percent alpha, 77.4 percent beta isomers).

EXAMPLE IV

Addition of MeSiHCl₂ to styrene in ethylene glycol dimethyl ether 57.5 grams of methyldichlorosilane (0.5 mole), 2.2 grams (2 wt.-percent catalyst of reactants) of 2 percent Pt/Al₂O₃, 2.2 grams of Ionol (2 wt.-percent of reactants), and 104 grams of ethylene glycol dimethyl ether (2 times weight of styrene) were charged to a 1-liter, 3-necked flask fitted with dropping funnel, mechanical stirrer, and reflux condenser. Heat was applied and the solution brought to gentle reflux. 52.1 grams of styrene (0.5 mole) were added with stirring over a 1-hour period. Reflux was continued for an additional hour, the solution cooled and filtered, solvent stripped, and distilled through a column packed with "Hastelloy B." Fractions (B.P. 233°–240° C. and 240° C.–244° C.) were obtained in 80.5 percent yield (ratio of isomers=12.5 percent alpha, 87.5 percent beta).

EXAMPLE V

Addition of MeSiHCl₂ to styrene 8440 grams of methyldichlorosilane (73.4 moles), 12 grams of Ionol (0.07 wt.-percent of reactants) and 165.0 grams (1 wt.-percent catalyst of reactants) of 2 percent Pt/Al₂O₃ were charged to a 22 liter flask equipped with dropping funnel, mechanical stirrer, thermometer, and water-cooled still head. Stirring was started and 7644 grams of styrene (73.4 moles) was slowly added as follows:

| Time | Flask Temp., °C. | Observations |
| --- | --- | --- |
| 10:15 | 13.2 | Start addition, apply gentle heat. |
| 10:20 | 18 | Some off gas through condenser. |
| 10:25 | 25 | |
| 10:29 | 29 | |
| 10:40 | 36 | Solution refluxing very strongly heat off. |
| 10:45 | | Mixture exploded. |

At 10:45 the reaction became uncontrollable blowing out of the reaction flask. A flash fire followed which blew the glass from the large hood in which the reaction was being run.

This example illustrates the violent reaction which may occur where the addition of a chlorosilane to styrene is attempted in the absence of a solvent. Where a solvent is employed, the reaction is easily controlled.

EXAMPLE VI

Addition of MeSiHCl₂ to styrene using .25 percent Pt/charcoal 57.5 grams of methyldichlorosilane (0.5 mole), 2.2 grams of Ionol (2 wt.-percent of reactants), and 5.5 grams (5 wt.-percent catalyst of reactants) of 0.25 percent platinum on charcoal catalyst were charged to a 1-liter, 3-necked flask fitted with thermometer, mechanical stirrer, dropping funnel, and reflux condenser. Heat was applied and 52.1 grams of styrene (0.5 mole) were added with stirring over a 30-minute period with reaction temperature rising gradually to 47° C. (A large amount of acid gas was evolved through the condenser during this time.) Additional heat was applied and the reaction continued for 1 hour (pot temperature=90° C.). After cooling, the catalyst was removed by filtration and the crude distilled through a 30-cm. Vigreaux column at atmospheric pressure. Three cuts were made between 235°–241.5° C. ($n_D^{25}$=1.5103–.5109), ($n_D^{25}$ of alpha= 1.5195, beta=1.5110). The cuts were combined and a sample submitted for infra-red analysis. Only beta-phenylethylmethyldichlorosilane was detected. Yield beta adduct=51 percent.

The addition was repeated and 20 percent excess MeSiHCl$_2$ was used with the above reaction conditions. Upon distillation two cuts (B.P.=247°–251° C.) $n_D^{25}$= 1.5110–.5113 were obtained and identified as the beta isomer. Yield=81 percent.

This experiment shows the necessity of employing an excess of chlorosilane in order to decrease styrene polymerization and increase the yield of the desired addition product where no solvent is employed. By the process of our invention, good yields of the beta-isomer may be obtained, and polymerization of styrene can be held to a minimum, without the necessity of employing excess amounts of chlorosilane. Accordingly, even when employing a beta-directing catalyst, such as a platinum-on-charcoal catalyst, it is preferable to employ a solvent in order to increase yields without use of an excess of reactants, to decrease the amount of styrene polymerization, and to control the addition reaction.

What is claimed is:

1. A process for producing beta-phenylethylchlorosilanes which comprises forming a mixture of styrene, a chlorosilane containing at least one hydrogen atom bonded to silicon, a catalyst taken from the group consisting of chloroplatinic acid, platinum, platinum on an inert support free of carbon, and a multi-component platinum-containing admixture free of carbon, and tetrahydrofuran in an amount of from 0.5 to 10 times the weight of styrene, and heating the mixture to effect the addition of the chlorosilane to the styrene.

2. A process for producing beta-phenylethylchlorosilanes which comprises forming a mixture of a chlorosilane containing at least one hydrogen atom bonded to silicon, a catalyst taken from the group consisting of chloroplatinic acid, platinum, platinum on an inert support free of carbon, and a multi-component platinum-containing admixture free of carbon, and tetrahydrofuran in an amount of from 0.5 to 10 times the weight of styrene, heating the mixture, gradually adding styrene to the heated mixture, and continuing to heat the mixture in order to effect the addition of the chlorosilane to the styrene.

3. A process for producing beta-phenylethylmethyldichlorosilane which comprises forming a mixture of methyldichlorosilane, a catalyst taken from the group consisting of chloroplatinic acid, platinum, platinum on an inert support free of carbon, and a multi-component platinum-containing admixture free of carbon, and tetrahydrofuran in an amount of from 0.5 to 10 times the weight of styrene, heating the mixture to a temperature of from about 25° C. to about 60° C., gradually adding styrene to the mixture, and continuing to heat the mixture at its refluxing temperature in order to effect addition of the methyldichlorosilane to the styrene to produce beta-phenylethylmethyldichlorosilane.

4. A process for producing beta-phenylethylmethyldichlorosilane which comprises forming a mixture of methyldichlorosilane, a catalyst taken from the group consisting of chloroplatinic acid, platinum, platinum on an inert support free of carbon, and a multi-component platinum-containing admixture free of carbon, and tetrahydrofuran in an amount of from 0.5 to 10 times the weight of styrene, heating the mixture to a temperature of from about 40° C. to about 45° C., gradually adding styrene to the mixture, and continuing to heat the mixture at its refluxing temperature in order to effect addition of the methyldichlorosilane to the styrene to produce beta-phenylethylmethyldichlorosilane.

5. A process for producing beta-phenylethyltrichlorosilane which comprises forming a mixture to trichlorosilane, styrene, a catalyst taken from the group consisting of chloroplatinic acid, platinum, platinum on an inert support free of carbon, and a multi-component platinum-containing admixture free of carbon, and tetrahydrofuran in an amount of from 0.5 to 10 times the weight of styrene, charging the mixture to a suitable pressure vessel, and heating the mixture to a temperature of from about 60° C. to about 145° C. to effect addition of the trichlorosilane to the styrene to produce beta-phenylethyltrichlorosilane.

6. A process for producing beta-phenylethylchlorosilanes which comprises forming a mixture of styrene, a chlorosilane containing at least one hydrogen atom bonded to silicon, a platinum on gamma-alumina catalyst, and tetrahydrofuran in an amount of from 0.5 to 10 times the weight of styrene, and heating the mixture to effect the addition of the chlorosilane to the styrene.

7. A process for producing beta-phenylethylchlorosilanes which comprises forming a mixture of styrene, a chlorosilane containing at least one hydrogen atom bonded to silicon, a catalyst taken from the group consisting of chloroplatinic acid, platinum, platinum on an inert support free of carbon, and a multi-component plantium-containing admixture free of carbon, and tetrahydrofuran in an amount of from one to two times the weight of styrene, and heating the mixture to effect the addition of the chlorosilane to the styrene.

8. A process for producing beta-phenylethylmethyldichlorosilane which comprises forming a mixture of methyldichlorosilane, a catalyst taken from the group consisting of chloroplatinic acid, platinum, platinum on an inert support free of carbon, and a multi-component platinum-containing admixture free of carbon, and tetrahydrofuran in an amount of from one to two times the weight of styrene, heating the mixture to a temperature of from about 25° C. to 60° C., gradually and slowly adding styrene to the mixture, and continuing to heat the mixture at its refluxing temperature in order to effect addition of the methyldichlorosilane to the styrene to produce beta-phenylethylmethyldichlorosilane.

9. A process for producing beta-phenylethylmethyldichlorosilane which comprises forming a mixture of methyldichlorosilane, a catalyst taken from the group consisting of chloroplatinic acid, platinum, platinum on an inert support free of carbon, and a multi-component platinum-containing admixture free of carbon, and tetrahydrofuran in an amount of from one to two times the weight of styrene, heating the mixture to a temperature of from 40° C. to 45° C., gradually adding styrene to the mixture, and continuing to heat the mixture at its refluxing temperature in order to effect addition of the methyldichlorosilane to the styrene to produce beta-phenylethylmethyldichlorosilane.

10. A process for producing beta-phenylethylmethyldichlorosilanes which comprises forming a mixture of methyldichlorosilane, a platinum on gamma-alumina catalyst, and tetrahydrofuran in an amount of from one to two times the weight of styrene, heating the mixture to a temperature of from about 25° C. to about 60° C., gradually adding styrene to the mixture, and continuing to heat the mixture at its refluxing temperature in order to effect addition of the methyldichlorosilane to the styrene to produce beta-phenylethylmethyldichlorosilane.

11. A process for producing beta-phenylethylmethyldichlorosilane which comprises forming a mixture of methyldichlorosilane, a platinum on gamma-alumina catalyst, and tetrahydrofuran in an amount of from one to two times the weight of styrene, heating the mixture to a temperature of from about 40° C. to about 45° C., gradually adding styrene to the mixture, and continuing to heat the mixture at its refluxing temperature in order to effect addition of the methyldichlorosilane to the styrene to produce beta-phenylethylmethyldichlorosilane.

12. A process for producing beta-phenylethyltrichlorosilane which comprises forming a mixture of trichlorosilane, styrene, a platinum on gamma-alumina catalyst, and tetrahydrofuran in an amount of from one to two times the weight of styrene, charging the mixture to a suitable pressure vessel, and heating the mixture to a temperature of from about 60° C. to about 145° C. to effect the addition of the trichlorosilane to the styrene to produce beta-phenylethyltrichlorosilane.

References Cited in the file of this patent

UNITED STATES PATENTS

| | | |
|---|---|---|
| 2,721,873 | MacKenzie et al. | Oct. 25, 1955 |
| 2,823,218 | Speier et al. | Feb. 11, 1958 |
| 2,846,448 | Speier | Aug. 5, 1958 |
| 2,846,458 | Haluska | Aug. 5, 1958 |
| 2,851,473 | Wagner et al. | Sept. 9, 1958 |

OTHER REFERENCES

Wagner et al.: "Industrial and Engineering Chem.," vol. 45 (February 1953), pages 367–73.

Speier et al.: "Jour. Am. Chem. Soc.," vol. 79 (February 1957), pages 974–9.